US010311235B2

(12) United States Patent
Bobritsky et al.

(10) Patent No.: US 10,311,235 B2
(45) Date of Patent: *Jun. 4, 2019

(54) SYSTEMS AND METHODS FOR MALWARE EVASION MANAGEMENT

(71) Applicant: Minerva Labs Ltd., Petach-Tikva (IL)

(72) Inventors: Eduard Bobritsky, Yahud-Monosson (IL); Erez Breiman, Tel-Aviv (IL); Omri Moyal, Nesher (IL)

(73) Assignee: Minerva Labs Ltd., Petach-Tikva (IL)

( * ) Notice: Subject to any disclaimer, the term of this patent is extended or adjusted under 35 U.S.C. 154(b) by 18 days.

This patent is subject to a terminal disclaimer.

(21) Appl. No.: 15/844,762

(22) Filed: Dec. 18, 2017

(65) Prior Publication Data

US 2018/0121654 A1 May 3, 2018

Related U.S. Application Data

(63) Continuation of application No. 14/639,191, filed on Mar. 5, 2015, now Pat. No. 9,846,775.

(51) Int. Cl.
  *G06F 21/56* (2013.01)
  *H04L 29/06* (2006.01)
  *G06F 16/245* (2019.01)

(52) U.S. Cl.
  CPC .......... *G06F 21/566* (2013.01); *G06F 16/245* (2019.01)

(58) Field of Classification Search
  CPC .. G06F 17/30424; G06F 21/566; G06F 21/56; G06F 2221/2123; H04L 63/1408; H04L 63/1441; H04L 63/1491
  See application file for complete search history.

(56) References Cited

U.S. PATENT DOCUMENTS

| 8,332,946 | B1 | 12/2012 | Boisjolie et al. |
| 8,365,297 | B1 | 1/2013 | Parshin et al. |
| 8,667,581 | B2 | 3/2014 | Steeves et al. |
| 8,763,125 | B1 | 6/2014 | Feng |

(Continued)

FOREIGN PATENT DOCUMENTS

WO    WO 2015/029037    3/2015

OTHER PUBLICATIONS

International Preliminary Report on Patentability dated Mar. 10, 2016 From the International Bureau of WIPO Re. Application No. PCT/IL2014/050775.

(Continued)

*Primary Examiner* — Amir Mehrmanesh

(57) ABSTRACT

A method for emulating at least one resource in a host computer to a querying hosted code. The method comprises monitoring a plurality of operating system (OS) queries received from a plurality of code executed on a monitored computing unit, the plurality of OS queries are designated to an OS of the monitored computing unit, detecting among the plurality of OS queries at least one query for receiving at least one characteristic of at least one resource of the monitored computing unit among the plurality of OS queries, the at least one query is received from querying code of the plurality of code, preparing a response of the OS to the at least one query, the response comprising a false indication at least one false characteristic of the at least one resource, and sending the response to the querying code in response to the at least one query.

17 Claims, 9 Drawing Sheets

(56) References Cited

U.S. PATENT DOCUMENTS

| | | | |
|---|---|---|---|
| 8,955,125 B2* | 2/2015 | Brown | H04L 63/1408 713/187 |
| 9,064,112 B2* | 6/2015 | Wang | H04L 51/12 |
| 2004/0128529 A1 | 7/2004 | Blake et al. | |
| 2004/0162994 A1 | 8/2004 | Cohen et al. | |
| 2010/0031353 A1 | 2/2010 | Thomas et al. | |
| 2010/0306850 A1 | 12/2010 | Barile et al. | |
| 2011/0023084 A1 | 1/2011 | Kraemer | |
| 2011/0167494 A1 | 7/2011 | Bowen et al. | |
| 2011/0219450 A1 | 9/2011 | McDougal et al. | |
| 2011/0225655 A1 | 9/2011 | Niemela et al. | |
| 2013/0145465 A1 | 6/2013 | Wang et al. | |
| 2013/0191924 A1 | 7/2013 | Tedesco et al. | |
| 2013/0275945 A1 | 10/2013 | Kollberg et al. | |
| 2016/0212154 A1 | 7/2016 | Bobritsky | |
| 2016/0259939 A1 | 9/2016 | Bobritsky et al. | |

OTHER PUBLICATIONS

International Search Report and Written Opinion dated Mar. 2, 2015 From the International Searching Authority Re. Application No. PCT/IL2014/050775.

Notice of Allowance dated Aug. 16, 2017 From the US Patent and Trademark Office Re. U.S. Appl. No. 14/639,191. (16 page).

Official Action dated Jul. 7, 2017 From the US Patent and Trademark Office Re. U.S. Appl. No. 14/914,040. (23 pages).

Restriction Official Action dated Apr. 19, 2017 From the US Patent and Trademark Office Re. U.S. Appl. No. 14/639,191. (7 Pages).

Fovino et al. "An Experimental Investigation of Malware Attacks on SCADA Systems", Elsevier(2): 139-145, 2009.

Vishnani et al. "Detecting & Defeating Split Personality Malware", IARIA 12: 7-13, 2011.

Official Action dated Jan. 24, 2018 From the US Patent and Trademark Office Re. U.S. Appl. No. 14/914,040. (20 pages).

* cited by examiner

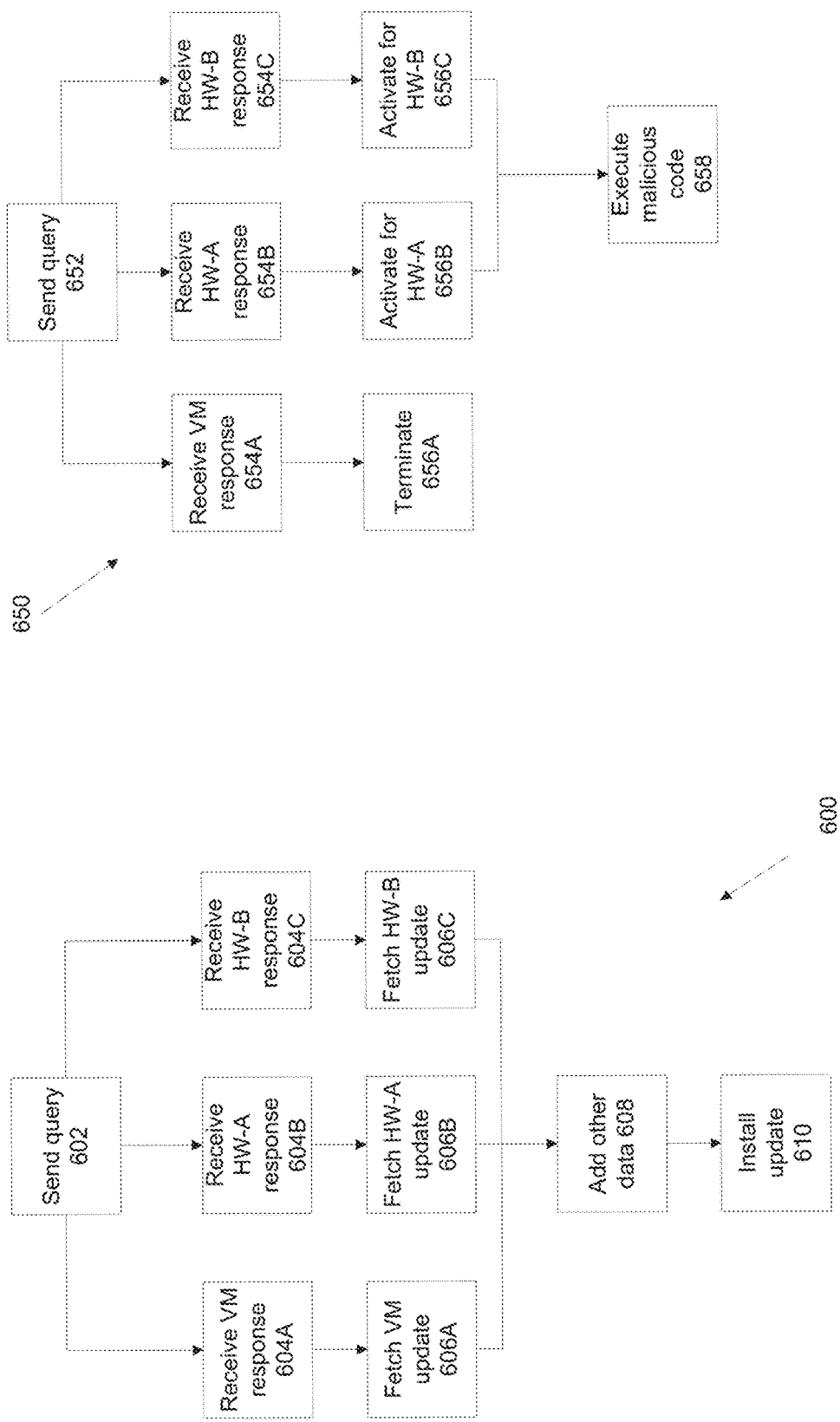

SYSTEMS AND METHODS FOR MALWARE EVASION MANAGEMENT

RELATED APPLICATION

This Application is a Continuation of U.S. patent application Ser. No. 14/639,191 filed on Mar. 5, 2015.

The contents of the above application are all incorporated by reference as if fully set forth herein in their entirety.

FIELD AND BACKGROUND OF THE INVENTION

The present invention, in some embodiments thereof, relates to systems and methods for protection against malicious code and, more specifically, but not exclusively, to systems and methods for protecting against evasive malware.

Automated security mechanism systems, such as a SandBox, test and monitor unverified programs that may contain malicious code in a safe environment in which the malicious code is unable to infect and damage or other computers, such as other computers in a network of an organization.

However, evasive malware is based on the assumption that the host computer will have such a security mechanism installed. The evasive malware issues a query to detect whether or not the host machine is running the security mechanism. When the response to the query indicates that the host machine is executing the security mechanism, the evasive malware attempts to evade detection, by not performing malicious activity inside the security mechanism. Malware might wait until the security mechanism times out before infecting the host computer, or might try to access and infect a computer without such a security mechanism. When the response to the query indicates the host machine is not executing the security mechanism, the malicious code activates and proceeds to damage the host computer, steal data from the host computer, and/or execute other malicious activities.

SUMMARY OF THE INVENTION

According to some embodiments of the present invention, there is provided a method for emulating at least one resource in a host computer to a querying hosted code. The method comprises monitoring a plurality of operating system (OS) queries received from a plurality of code executed on a monitored computing unit, the plurality of OS queries are designated to an OS of the monitored computing unit, detecting among the plurality of OS queries at least one query for receiving at least one characteristic of at least one resource of the monitored computing unit among the plurality of OS queries, the at least one query is received from querying code of the plurality of code, preparing a response of the OS to the at least one query, the response comprising a false indication at least one false characteristic of the at least one resource, and sending the response to the querying code in response to the at least one query.

Optionally, the false indication is of an execution of a security mechanism for processing running programs by the monitored computing unit, the false indication is sent while the monitored computing unit does not execute the security mechanism.

Optionally, the false indication is of an absence of execution of a security mechanism for processing running programs on the monitored computing unit, the false indication is sent while the monitored computing unit executes the security mechanism.

Optionally, the at least one query comprises a query for accessing at least part of sensitive data managed by the OS of the monitored computing unit; wherein the false indication comprises an indication of a false copy of the at least part of the sensitive data.

Optionally, the plurality of OS queries comprises a plurality of OS Application Program Interface (API) service requests selected to invoke the OS to perform a task at runtime.

Optionally, the monitoring comprises hooking the plurality of OS queries before the OS receives the plurality of OS queries.

Optionally, the method further comprises hooking a true response by the OS to the OS query before the querying code receives the true response.

Optionally, the plurality of OS queries comprises a member of a group consisting of a function call, an event and a message.

Optionally, the method further comprises classifying the querying code as a malicious code and blocking at least one function of the querying code from being executed by the monitored computing unit.

Optionally, the method further comprises detecting at least one action performed by the querying code after receiving the response and classifying the querying code according to the at least one action.

More optionally, the detecting comprises matching the at least one action to a predefined model and classifying the querying code according to the match.

Optionally, the method further comprises counting the number of processor instructions that arise from the response and classifying the querying code according to the counting.

Optionally, the method further comprises accessing and analyzing the executable instructions of the querying code stored within a local memory of the monitored computing.

Optionally, the response is a preconfigured response emulating a response of a computing unit running a SandBox environment for executing the querying code.

Optionally, the response is a preconfigured response emulating a response of a computing unit of without an actual resource managed by the monitored computing unit.

Optionally, the method further comprises managing a general response policy defining a plurality of local response policies each for another of a plurality of monitored computing units including the monitored computing unit; wherein the preparing comprises preparing the response according to response instructions defined in a respective the local response policy.

More optionally, the method further comprises in response to the detecting at least one query, managing the general response policy by dynamically correlating between at least some of the plurality of local response policies at run time, wherein the local response policy for each one of a plurality of monitored computing units is correlated based on the general response policy.

More optionally, the method further comprises forwarding the querying code to run in a testing environment, detecting at least one additional query for receiving the at least one characteristic among the plurality of operating system (OS) queries from the querying code, preparing an additional response of the OS to the at least one additional query for provoking the querying code to escalate a malicious attack, the additional response comprises another false indication of an absence of execution of a security mechanism for processing running programs on the monitored computing unit, the false indication is sent while the testing environment executes the security mechanism, and sending the additional response to the querying code in response to the at least one additional query and monitoring the querying code for detecting the malicious attack.

More optionally, the method further comprises calculating a score for the querying code and managing operations of the querying code according to the score.

According to some embodiments of the present invention, there is provided a hosting device for emulating at least one resource to a querying hosted code. The device comprises a processor unit coupled to an evasion manipulation module, the evasion manipulation module for implementing stored code, the stored code comprising code to monitor a plurality of operating system (OS) queries send from a plurality of code executed on a monitored computing unit to an OS of the monitored computing unit, code to detect among the plurality of OS queries at least one query for receiving at least one characteristic of at least one resource of the monitored computing unit among the plurality of operating system (OS) queries, the at least one query is received from a querying code of the plurality of code, code to prepare a response of the OS to the at least one query, the response comprising at least one false characteristic of the at least one resource, and code to send the response to the querying code in response to the at least one query.

More optionally, the method further comprises a respective processing unit of at least one of a plurality of network nodes prepares the false indication to indicate an absence of execution of a security mechanism for processing running programs on a respective the monitored computing unit and a respective the processing unit of at least one other of the plurality of network nodes prepares the false indication to indicate an execution of the security mechanism by a respective the monitored computing unit.

According to some embodiments of the present invention, there is provided a system for emulating at least one resource to a querying hosted code. The system comprises a plurality of evasion manipulation modules which are installed in a plurality of connected computing nodes, a processor coupled to each evasion manipulation module, each evasion manipulation module for implementing stored code, the stored code comprising: code to respond to OS queries received from one or more querying codes hosted by respective computing nodes with false responses faking the presence or the absence of a security mechanism in the respective hosting computing node such that when the querying code is a malicious code an escalation process is triggered in the computing node with a security mechanism.

Optionally, the evasion manipulation modules of respective connected computing nodes are adapted to generate the fake responses such that the malicious code is passively routed from at least one computing node without the security mechanism to at least one computing node having the security mechanism.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 6B:
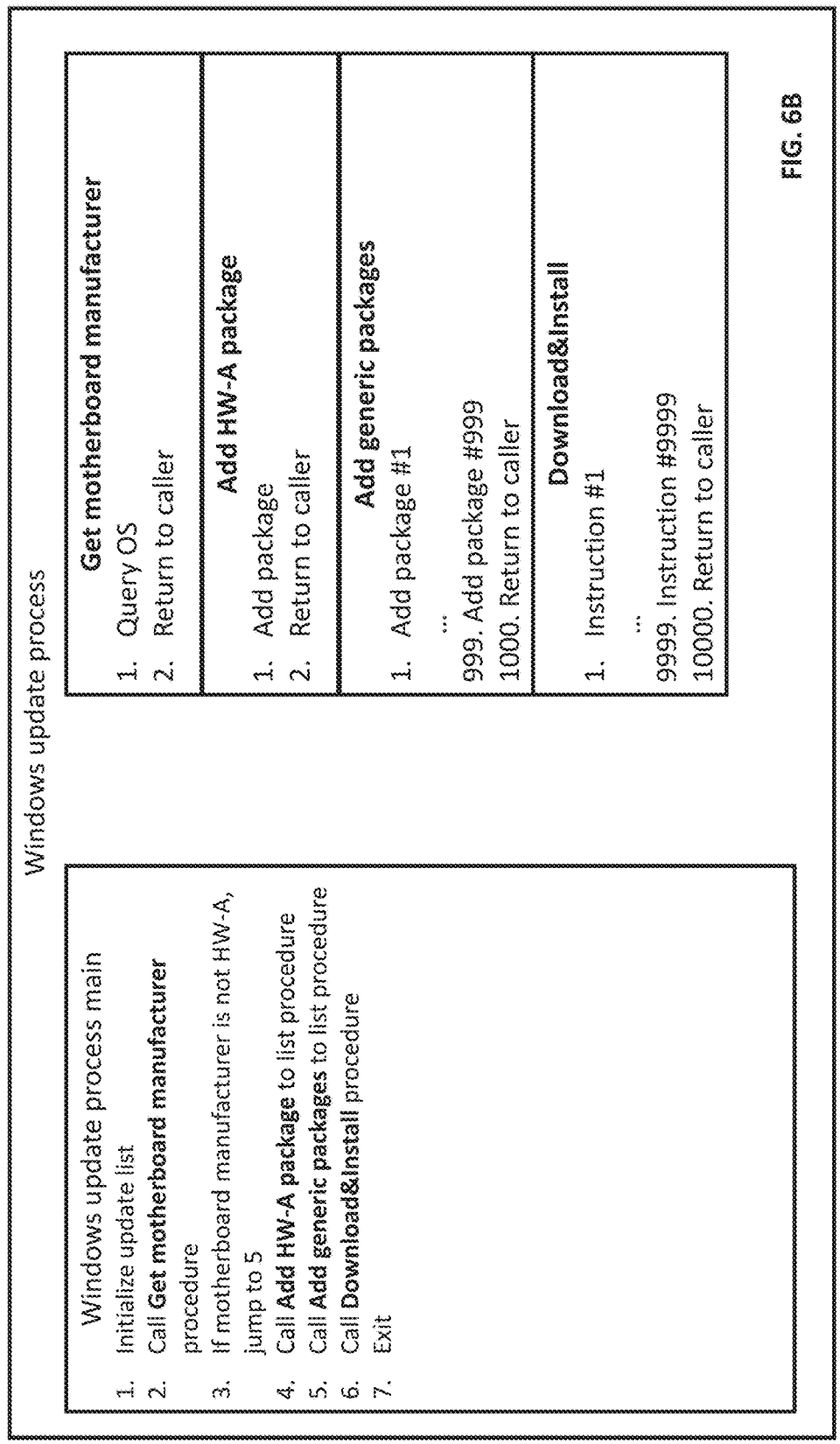
Figure 6C:
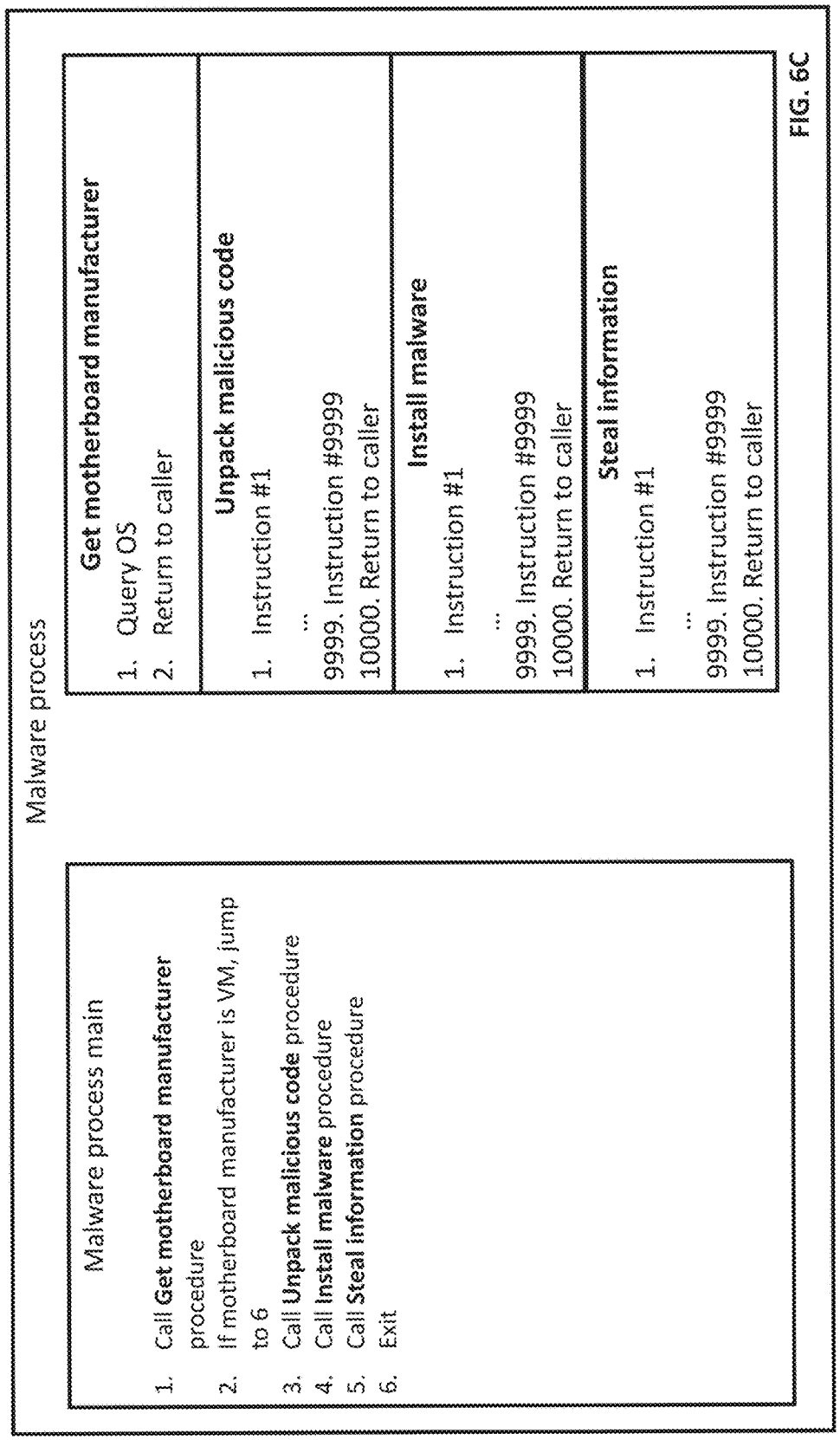
Figure 7:
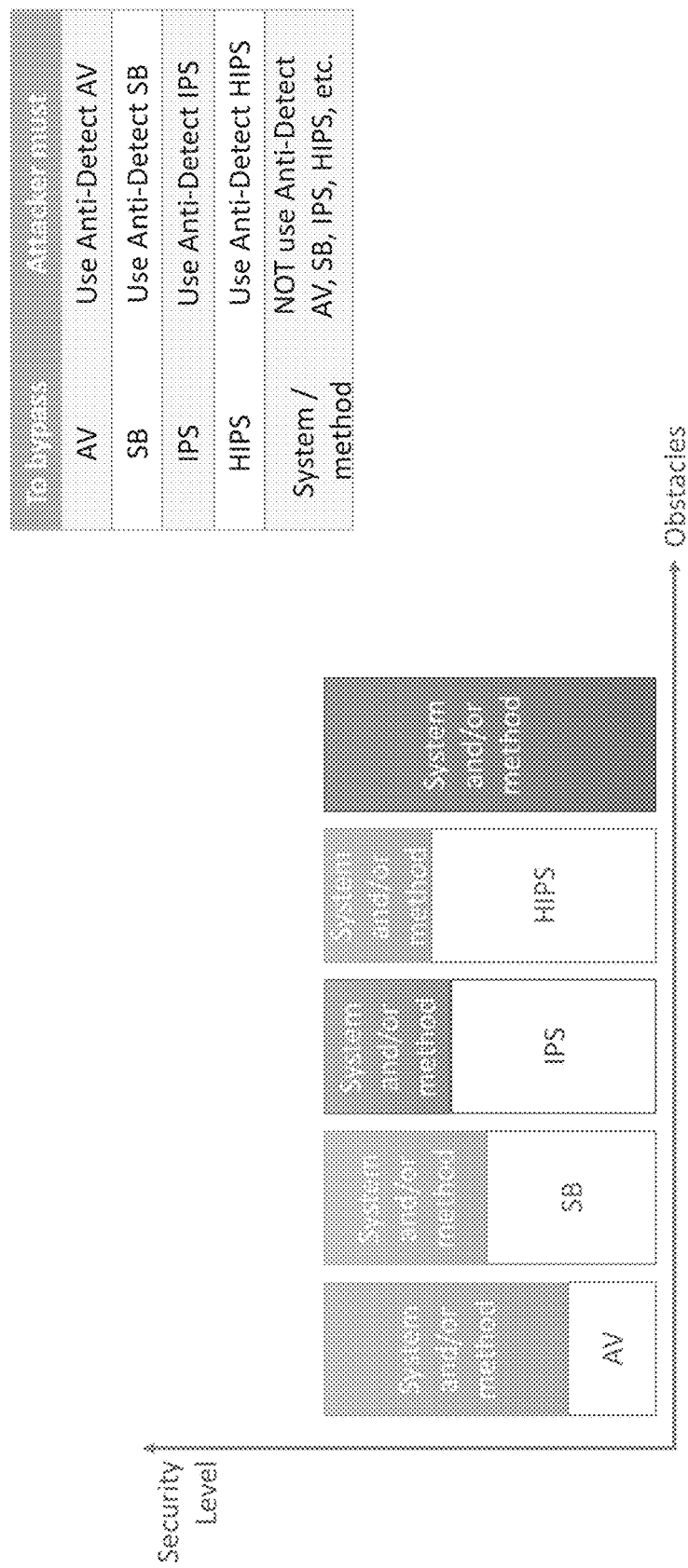

FIG. 6A includes flowcharts depicting instruction execution flows according to responses received from queries, in accordance with some embodiments of the present invention;

FIGS. 6B-6C correspond to the flowcharts of FIG. 6A, in accordance with some embodiments of the present invention; and FIG. 7 is a chart graphically depicting security levels according to different security barriers, in accordance with some embodiments of the present invention.

DESCRIPTION OF SPECIFIC EMBODIMENTS
OF THE INVENTION

The present invention, in some embodiments thereof, relates to systems and methods for protection against malicious code and, more specifically, but not exclusively, to systems and methods for protecting against evasive malware.

An aspect of some embodiments of the present invention relates to systems and methods for emulating resources of a host computer for hosted code (e.g., application), by preparing a false response to an operating system (OS) query received from the hosted code, for instance by an evasion manipulation module implementable on the host computer and sending the false response by the manipulation module back to the hosted code. Optionally, the OS query is hooked, preventing the OS query from reaching the OS. The OS query is processed by the emulation manipulation module, which prepares the false response that fakes the resources on the host computer. Alternatively, OS queries are eavesdropped such that they are still processed by the OS, with the response to the OS query by the OS being hooked, preventing the true response from reaching the hosted application. The false response is sent to the hosted code instead of the true response. In this manner, the reaction of the hosted code is indirectly and/or passively controlled by the false response, instead of allowing the hosted code to react to a true response by escalating a malware attack.

Optionally, the hosted code is evasive malicious code that infected the host computer. Evasive malicious code attempts to evade detection by security mechanisms, by trying to detect whether or not the host computer is running such security mechanisms, and not executing when such security mechanisms have been detected to try and evade detection. Optionally, when the host computer is not executing such a security mechanism for automated detection of malware, for example, an anti-virus program, a Sandbox, and an anti-malware program, the evasion manipulation module provides a false response to the querying evasive malicious code that falsely indicates that such security mechanisms are running on the host computer. When the OS query issued by the malware is related to execution of the security mechanism (e.g., the presence of a SandBox virtual machine), the false response sent to the malware in response to the OS query indicates that the security mechanism is running on the host computer. In this manner, the evasive malicious code is deceived into thinking that the host computer is executing the security mechanism, which may prevent the evasive malicious code from executing and damaging the host machine.

Alternatively, when the host computer is executing the security mechanism, the false report sent back to the malicious code by the evasion manipulation module in response to the OS query indicates that the host computer is not executing the security mechanism. In this manner, the evasive malicious code is deceived into thinking that the host computer is not running the security mechanism, which triggers the malicious code into execution. The malicious activity may then be detected by the security mechanism.

Optionally, the OS queries are monitored to detect OS queries of one or more characteristics of one or more resources of the host computer, for example, by a query detection module component of the evasion manipulation module. The queries may be monitored by the query detection module to detect OS queries indicative of malicious code attempting to detect a security mechanism, for example, the presence of an anti virus signatures file, files related to security mechanisms, configuration data related to security mechanisms, and processes related to virtual machines associated with a Sandbox.

Optionally, a code (e.g., an analysis module component of the evasion manipulation module) implementable by a processor of the hosting computing monitors the operation of the hosted code after the hosted codes receives the false response generated by the evasion manipulation module. The analysis module may classify the hosted application as malicious code. The classification may be based on characteristics of the monitored activity in response to the false response. For example, when the false response is indicative of the presence of a running security mechanism on the host computer, lack of activity or a simple tasks performed by the hosted application are indicative of malicious code which is attempting to continue evasive maneuvers.

An aspect of some embodiments of the present invention relates to a system including multiple evasion manipulation modules deployed in multiple network computing nodes. Each evasion manipulation module is implementable by a processor of a certain of the computing node to respond with false responses to suspicious querying codes locally running on the certain computing node. Each false response deceives a suspicious querying code to calculate a wrong reaction to a presence or an absence of a security mechanism. In such a manner a malicious code does not escalates an attack in a computing node without a security mechanism and escalates an attack in another computing node with a security mechanism. This deployment is arranged to passively route malicious codes to computing nodes with a security mechanism as malicious codes route among computing nodes without escalating an attack as long as no security mechanism is actually present.

The emulated responses generated at each computing node by respective evasion manipulation modules may be pre-defined according to a general and/or local response policy based on the network topology, to deceive the evasive malicious code into the designated target node.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms querying code (or code) and querying application (or application) are sometimes interchangeable.

Figure 1:
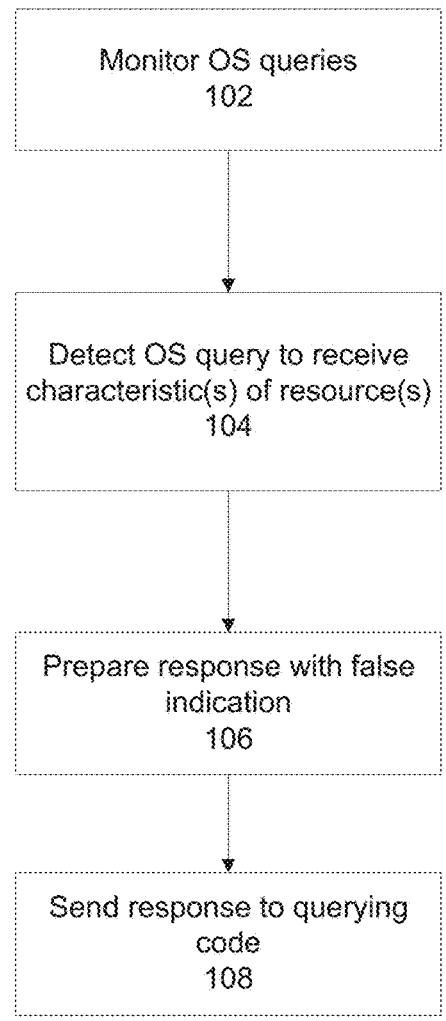
FIG. 1 is a flowchart of a method for emulating one or more resources in a host computer to a querying hosted code, in accordance with some embodiments of the present invention.
Figure 2:
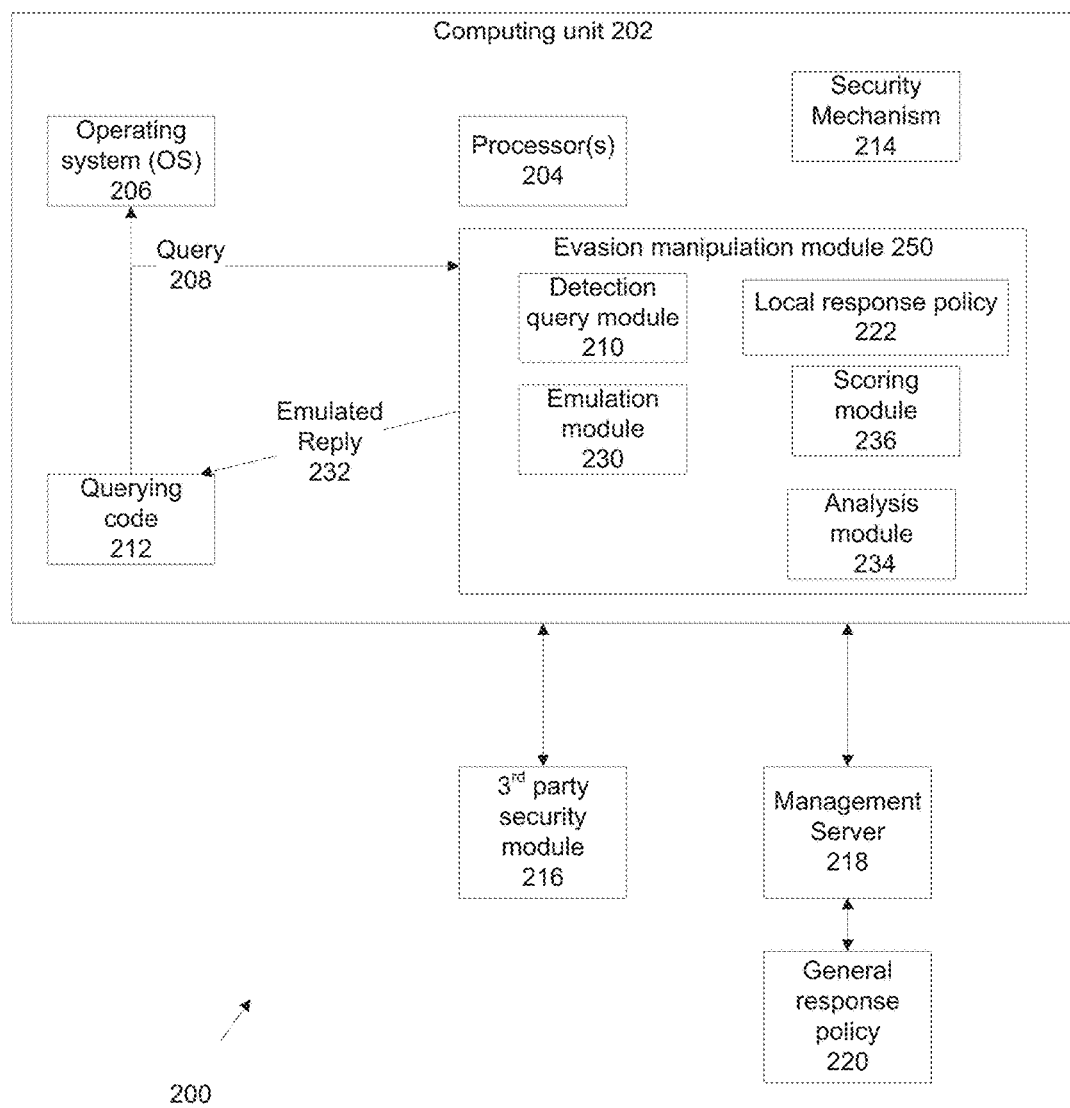
FIG. 2 is a block diagram of components of a system for emulating one or more resources in a host computer to a querying hosted code, in accordance with some embodiments of the present invention.

Reference is now made to FIG. 1, which is a flowchart of a method for emulating one or more resources of a host computer to a querying hosted application and/or code, optionally malicious code such as evasive malicious code attempting to infect the host computer, in accordance with some embodiments of the present invention. Reference is also made to FIG. 2, which is a block diagram of components of a system for emulating one or more resources of a host computer to a querying hosted application, in accordance with some embodiments of the present invention. The system of FIG. 2 may identify evasive malicious code, block and/or prevent attacks from the malicious code by providing false responses regarding resources of the hosting operating environment to the malicious code. The method of FIG. 1 may be executed by the system of FIG. 2.

The systems and/or methods described herein, such as the evasion manipulation module, may prevent execution (and possible damage) of the malicious code on the hosting computing unit, by generating false responses to queries sent by the malicious code, to cause the malicious code to believe it is executing within a malicious code detection system, and/or an environment with code reversing utilities. The malicious code may remain in the evasive state, which is non-damaging to the hosting computer unit, based on the generated emulated response to the query.

The systems and/or methods described herein such as the evasion manipulation module may direct and/or provoke the malicious code to activate when in a safe contained environment including a malicious code detection system, by generating replies to the query indicative of the absence of the malicious code detection system. The malicious code, thinking it is executing in an environment without a code detection system will execute and be identified by the malicious code detection system.

The systems and/or methods described herein such as the evasion manipulation module, may improve performance of a computer, a network, and/or a system by improving the efficiency of detection of evasive malicious code such as increasing the detection rate, for example, by reducing memory allocated to detection of the malicious code and/or processor resources used to detect the malicious code. Standard searching (i.e., without the systems and/or methods described herein) for evasive malicious code within a computer may cause performance degradation, such as due to detailed scanning of storage units (e.g., hard drives) for the presence of malicious code. Such scanning may require large sizes of allocated memory and/or may tie up processor resources for long periods of time until the scan is completed. Moreover, such scans need to be repeated often to detect new infections. The systems and/or methods described herein detect evasive malicious code efficiency, which may not require a standard scan of the storage units (which may degrade computer performance). The systems and/or methods may reduce the frequency of scans and/or resources used by the scan, such as by focusing the scan to the identified malicious code. The systems and/or methods may detect evasive malicious code that would otherwise remain undetected or difficult to detect using standard anti-malware techniques such as scanning of the storage unit. The systems and/or method may improve detection of evasive malicious code in performance sensitive system (e.g., enterprise implementations which performance and user experience is important) without necessarily increasing existing detection configurations, which may define minimal detection attempts to detect malicious code.

System 200 includes a hosting computing unit 202, which may be a single computer or multiple computers, optionally distributed. Computing unit 202 may be, for example a desktop computer, a laptop computer, a server, a mobile device, a Smartphone, a virtual machine, a tablet computer, a controller for a system (e.g., airplane, car, manufacturing equipment), and/or a supervisory control and data acquisition (SCADA) system. Computing unit 202 includes one or more processors 204, which may be central processing units (CPU), graphics processing units (GPU), arranged as single units or as a distributed processing system. Computing unit 202 has installed thereon an operating system (OS) module 206.

At 102, operating system (OS) queries 208 received from one or more code 212 and/or applications executed on host computer unit 202 are monitored by a query detection module 210, which is optionally a component of an evasion manipulation module 250. Code (e.g., evasion manipulation module 250) implementable by processor 204 of hosting computing unit 202 may monitor OS queries 208. OS queries 208 are designated to OS 206 of the monitored computing unit 202. The queries may be generated by safe applications (e.g., user programs installed on the computing unit, and/or new programs the user is trying to install) and/or by malicious code, optionally evasive malicious code.

Optionally, the monitoring is performed by hooking the OS queries before the OS receives the OS queries, for example, by a query detection module 210. Alternatively or additionally, the replies by the OS to the OS queries (being sent to the requesting application) are monitored by hooking. The replies, which represent a true response by the OS to the request, are hooked before querying application 212 receives the true response reply. Code (e.g., evasion manipulation module 250) implementable by processor 204 of the hosting computing unit 202 may perform the hooking.

At 104, one or more queries 208 are detected from among the OS queries by processor 204, for example, by an emulation module 230, which is optionally a component of evasion manipulation module 250. Code (e.g., evasion manipulation module 250) implementable by processor 204 of the hosting computing unit 202 may detect the query based on the request to receive one or more characteristics of one or more resources of the monitored computing unit. The detected query is received from a querying application of the applications running on the host computing unit. The querying application 212 is suspected or believed to be malicious code.

The evasive malicious code may be in an encrypted state. The malicious code may be packed. As long as the malicious code remains in the encrypted state and/or packed state, the malicious code is unable to attack the hosting computer, however malicious code detection systems may be unable to easily detect the malicious code (e.g., may require a resource intensive detailed scan to detect). The malicious code is associated with a decision module that decides when the attacking portions of the malicious code should be activated and/or executed (e.g., decrypted and/or unpacked). The attacking malicious code may be easier to identify by anti malware software.

The OS queries may be detected based on their type, which may be related to querying malicious code attempting to decide whether to remain evasive or attack. OS queries 208 may include OS Application Program Interface (API) service requests selected to invoke the OS to perform a task at runtime. Before code (e.g., an application) which may be malicious or legitimate interacts with the surrounding execution environment (e.g., with files, with the screen to display images to the user, to connect to a network, to execute other processes, and to learn characteristics of the hosting system environment), the code passes queries and/or requests to one of the OS's layers. The API of the OS may define the available functions that may be performed. For example, code that wants to interact with a file residing in a specific path, such as to check the attributes of the file, may call an API defined function, such as GetFileAttributes. The OS replies to the code with the file's attributes.

The OS queries may be detected based on the knowledge that the malicious code sends OS queries 208 to analyze the nature of the execution environment in which it resides. The OS queries 208 may be detected based on identifying OS queries that include one or more of: a function call, an event, and/or a message. For example, to identify OS queries sent by malicious code to detect whether or not the malicious code is residing within a SandBox, the OS queries including requests to obtain characteristics of the SandBox may be identified. When the SandBox is implemented based on a virtual machine, the OS queries may be identified as originating from malicious code which is trying to detect the SandBox by issuing queries such as: the existence of processes that support virtual machines, files that represent the processes, and registry values that represent the processes.

The OS queries related to malware may be detected based on other methods which may be used by malicious code to evade detection. For example, queries related to detecting debugging tools, network sniffing, or other tools used to reverse engineer software which may be used to detect malicious code. For example, queries related to detecting anti-virus software, such as detecting virus file definitions, and virus signature file version.

The decision of which queries may be related to malicious code and/or which queries may be related to safe code may be performed by the evasion manipulation module 250 optionally by emulation module 230, for example, based on a white list of known safe queries, and/or based on a black list of known malicious related queries.

At 106, a response 232 of the OS to the query (or queries) is prepared by processor 204, optionally by emulation module 230, which is optionally a component of evasion manipulation module 250. It is noted that in the case where the OS system is allowed to respond, the response is hooked, and another response is prepared. Code (e.g., evasion manipulation module 250) implementable by processor 204 of the hosting computing unit 202 may prepare response 232, which includes a false indication of one or more false characteristics of the resource(s). The false indication may be designed to trigger a desired response by the querying application, which may be different, such as opposite of a response triggered by a true response.

The prepared response may be transmitted back to the querying module using the same or similar message format used for a corresponding true OS response (e.g., encapsulated frame), and/or using the same or similar communication protocol.

Optionally, the false indication is indicative of execution of a security mechanism (e.g., a SandBox, and/or an anti-virus program) for processing running programs by monitored computing unit 202. The false indication is sent back to the querying application by evasion manipulation module 250 (which may be malicious code) when the monitored computing unit does not actually execute the security mechanism (e.g., a security mechanism is not installed on the computing unit, or the installed security mechanism is not activated, or the querying application is not executing within the security mechanism). Optionally, the response is a predefined response emulating a response of a computing unit running a SandBox environment for executing the querying application. In such a case, the false indication may maintain the malicious code in the evasive and non-damaging state. The false indication may be sent when the desired action is to maintain the malicious code in the evasive state.

Alternatively, the false indication is indicative of an absence of execution of a security mechanism 214. The false indication is sent when the monitored computing unit executes security mechanism 214. Optionally, the response is a predefined response emulating a response of the computing unit without an actual resource managed by the monitored computing unit, for example, without a SandBox. In such a case, the false indication may trigger activation of the malicious code within security mechanism 214. The false indication may be sent when the desired action is to activate the malicious code, such as to identify the malicious code by the security mechanism.

At 108, the false indication response is sent back by processor 204, optionally by emulation module 230 and/or evasion manipulation module 250, to the querying application 212, in response to the query 208. Code (e.g., evasion manipulation module 250) implementable by processor 204 of the hosting computing unit 202 may transmit the response. Optionally, the malicious code is maintained in the evasive state in response to the received response. Alternatively, the malicious code is activated in response to the received response.

Figure 3:
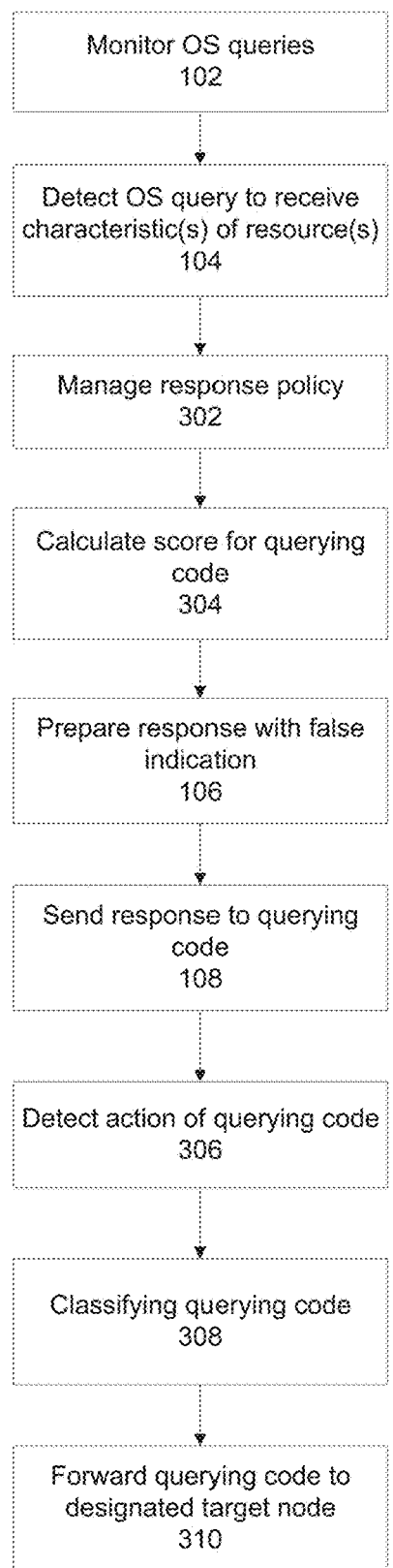
FIG. 3 is a flowchart of some additional optional features of the method of FIG. 1, such as managing a response policy, calculating scores for the querying code, detecting actions of the querying code, classifying the querying code, and/or forwarding the querying code to a designated target node, in accordance with some embodiments of the present invention.

Reference is now made to FIG. 3, which is a flowchart of additional optional features of the method of FIG. 1, in accordance with some embodiments of the present invention. The additional features may determine how the evasion manipulation module responds to the querying application (e.g., by a response policy), may calculate a score for the querying code, may detect actions of the querying code in response to the emulated reply, may classifying the querying code, and/or may passively routing the querying code to a target node.

At 102, OS queries are monitored, as described herein with reference to FIG. 1.

At 104, one or more queries are detected from the monitored queries, as described herein with reference to FIG. 1.

Optionally, at 302, a general response policy 220 defining local response policies 222 is managed, for example, using a management server 218 in communication with computing unit 202. Each local response policy 222 is managed for each of the monitored computing units 202. The response policy may include, for example, a set of rules, a decision mechanism, and a look-up table. Local response policy 222 may be a component of evasion manipulation module 250.

Code (e.g., evasion manipulation module 250) implementable by processor 204 of the hosting computing unit 202 may generate local response policies and/or manage the local response policy.

The general and/or local response policies may be implemented as, for example, one or more of: a set of rules, a function, a look-up table, and an artificial intelligence decision algorithm.

Optionally, the response to the query (of block 106) is prepared by evasion manipulation module 250 according to response instructions defined in respective local response policy 222 of each computing unit 202. When a query about a system object (e.g. file, process, service, and/or registry key) is detected, the response is based on a predefined response according to the policy. For example, when the local policy defines that the computing unit emulates execution of a SandBox (e.g., when no actual SandBox is locally installed), the local policy may provide instructions to respond to a query by an application asking whether a processes called "SandBox.exe" is executing, with a response indicating that the process is executing. Alternatively, for example, when the local policy defines that the computing unit emulates lack of execution of the SandBox (i.e., the SandBox is actually executing), the local policy may provide instruction to response to the query with a response indicating that the process "SandBox.exe" is not executing.

Optionally, the general response policy is managed by evasion manipulation module 250 in response to the detected query, by dynamically correlating between at least some of the local response policies at run time. The response policy at one computing unit may be correlated to match the response policy at another computing unit. Alternatively or additionally, the response policy at the same computing unit may be correlated by evasion manipulation module 250 to match earlier responses at the same computing unit. The correlation may be automatically performed centrally by management server 218 and/or locally by each processor of each computing unit. The correlation may increase the reliability and/or credibility of the emulated response. This may make it more difficult for the malicious code to detect that the response is emulated. For example, when the local response policy contains two ways in which to respond to a query related to a SandBox, such as emulating an implementation of SandBox A or SandBox B, once one of the SandBoxes has been selected for response, subsequent responses are correlated to the first response. The correlation may be based on the observation that it may be unlikely that one computing unit will have two different SandBoxes installed. In another example, when multiple computing nodes are each capable of emulating two different SandBoxes, once a reply to a query at one computing node includes an emulation of one of the SandBox implementations, all connected computing nodes may be directed to emulated to selected SandBox implementation and ignore the other implementation. The correlation may be based on the observation that it is unlikely that in a network different SandBox implementations will be used, as doing so may, for example, increase administration costs. The correlation may make it more difficult for malicious code to determine whether an emulation module is providing false indications or not.

The general response policy defines a higher-level policy, which may be implemented differently at the lower-lever, locally by each local policy. The general response policy may define an overall network approach to handling queries, which may be implemented differently at each computing node. Optionally, the general response policy defines a network topology for passive routing of malicious code to a designated target node and/or secure testing environment, as described herein. Each local policy may define the role of the local computing unit in the passive routing, such as passively directing the malicious code to the designated target node.

The general and/or local policy may define query responses to hide important software modules and/or important assets, for example, medical records, financial files, and sensitive control software (e.g., aircraft control). When the query is related to the presence of the important software modules, the policy may define replying with a response indicating that the important software module does not exist. The general and/or local policy may define a white list for indicating which queries should be responded to without any manipulation, for example directly by the OS. The general and/or local policy may define a black list for indicating which queries should be responded to with manipulation, for example directly by the evasion manipulation module 250.

Optionally, the local policy and/or general policy includes definitions to protect the malicious code from detecting the presence of the emulating systems and/or methods described herein, such described with reference to FIGS. 1-3. The emulation modules, files, processes, services and/or code emulate themselves as non-existent to evade detection by the malicious code. The policy definitions (e.g., rules) may be automatically generated locally at each computing unit and/or centrally at the management server, for example, by a self-defense module which may be locally installed and/or remotely accessed from a central server. Self-defense module may be a component of evasion manipulation module 250. The policy may define responses to queries related to the presence of the emulating system with negative false responses emulating the absence thereof.

Figure 4:
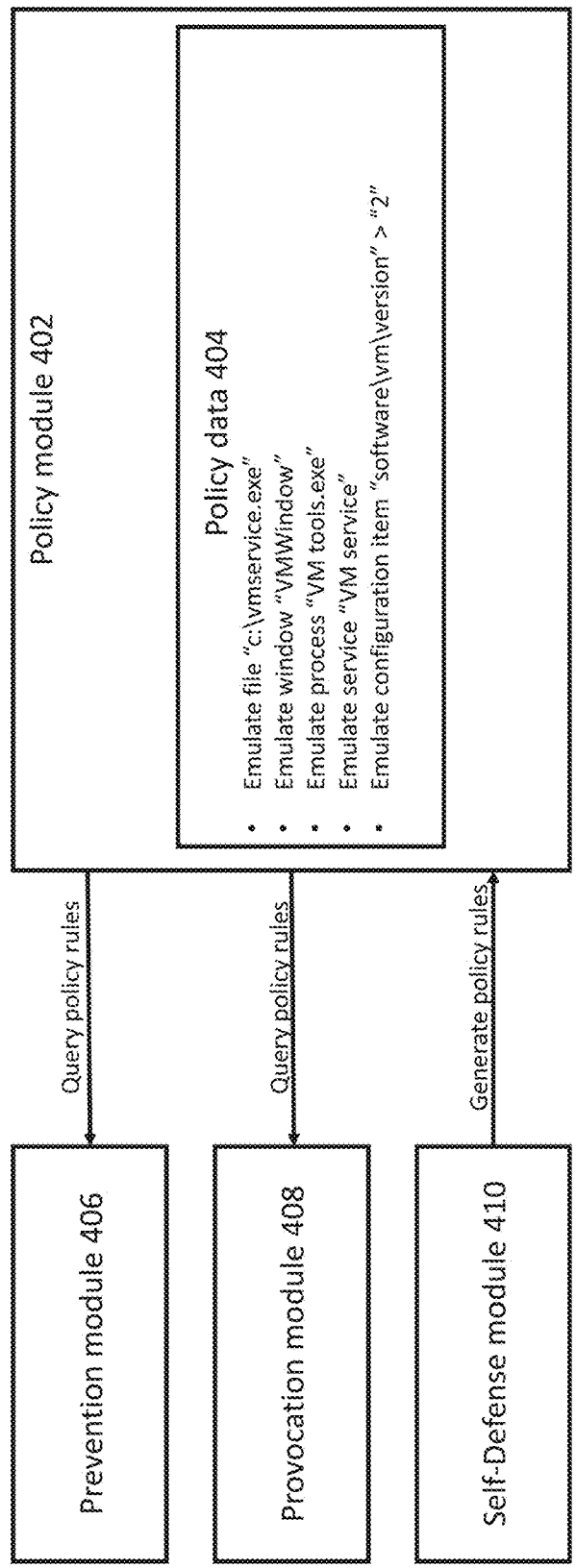
FIG. 4 is a block diagram of an example implementation of a policy for emulating replies to querying code, in accordance with some embodiments of the invention.

Reference is now made to FIG. 4, which is a block diagram of an example implementation of a policy for emulating replies to a querying application, in accordance with some embodiments of the invention. A policy module 402 stored on or in association with a monitored computing unit, contains code implementable by processor 204 of the hosting computing unit 202 that generates one or more policy rules, automatically and/or the rules may be manually defined by a user. The policy rules may be generated from data stored in a policy data module 404, which may include data of which characteristics of which resources are executing on the monitored computing unit, and/or which characteristics of which resources that are not executing may be emulated. For the policy rules may define which files, windows, processes, services and/or configuration items are emulated.

The policy rules may be provided as network messages, application programming interface commands or other signal transmission, by policy module 402 to a prevention module 406, stored on or in associated with the monitored computing unit, which contains code implementable by processor 204 of the hosting computing unit 202 that defines the emulated response with false indication to provide to the querying application to prevent malicious code from executing. Alternatively or additionally, the policy rules may be provided by policy module 402 to a provocation module 408, stored on or in associated with the monitored computing unit, which contains code implementable by processor 204 of the hosting computing unit 202 that defines the emulated response with false indication to provide to the querying application to trigger escalation of an attack by the malicious code. It is noted that the policy may define when the true response by the OS is to be provided to the querying application, for example, when the querying application has been validated to be legitimate code. It is noted that prevention module 406 and/or provocation module 408 may be integrated within evasion manipulation module 250 described herein.

A self-defense module 410 contains code implementable by a processor of the hosting computing unit may automatically gather data to provide as network messages, application programming interface commands or other signal transmission, to data module 410 and/or generate a policy definition to hide one or more modules 402, 404, 406, 408 and/or other related modules from malicious code. Such policy definition is designed to provide a false indication to malicious code attempting to detect the presence of policy module 402 (and/or other related modules). It is noted that self-defense module 410 and/or evasion manipulation module 250 may gather data and/or automatically generate a policy to hide other sensitive and/or confidential data stored on the monitored computing node, for example, confidential documents, medical records and financial information.

By being able to hide the existence of sensitive documentation or parts thereof, for example medical records and financial information, the invention can also prevent attacks that are not using evasion techniques and/or were already installed before the invention was implemented. This can be done when the malware is running and tries to access and/or manipulate sensitive data (e.g. private records and file). While some embodiments of the invention stops the $5^{th}$ level of the chain of attack, this such an access manipulation prevents a malware from prevailing in an attack on the $7^{th}$ stage (e.g. Data exfiltration). Optionally, sensitive data managed by the OS is locally crawled and mapped to identifying a query requesting the sensitive data. This may be done by identifying access privileges, authoring user, sensitive content such as credit card numbers, personal images and videos, location logs, business data and/or the like. Data categorization may be performed using semantic analysis, metadata analysis, image processing techniques and/or the like.

Referring now back to FIG. 3, optionally, at 304, a score is calculated for the querying application, by code (e.g., a scoring module 236, which is optionally a component of evasion manipulation module 250) implementable by processor 204 of the hosting computing unit 202. The score may be calculated based on the received query. The score may be calculated based on a correlation and/or match with one or more definitions of the local and/or general policy. For example, the score may be calculated based on the one or more received queries being related to the security mechanism (e.g., high score) and not being related to the security mechanism (e.g., low score). Each policy definitions, such as a set of rules, may be associated with a score. When the policy definition is met (e.g., the set of rules is true or false) the associated score is analyzed.

The score may be calculating based on a subset or all queries issued by the same querying application.

Optionally, the score is indicative of the probability of the querying application being related to malicious code and/or not being related to malicious code.

Operations of the querying application may be managed according to the score, by controlling the generation of the emulated response. For example, when the score is indicative of malicious code, the response sent back may be the emulated response of the false indication. When the score is indicative of legitimate code, the response sent back may be the true indication reply provided by the OS, for example, the query may be allowed to continue to the OS.

At 106, the emulated response with false indication is prepared as described herein with reference to FIG. 1.

At 108, the emulated response is sent to the querying application as described with reference to FIG. 1.

At 306, code (e.g., an analysis module 234, which is optionally a component of evasion manipulation module 250) implementable by processor 204 of the hosting computing unit 202 detects one or more operations performed by the querying application after receiving the response. The querying application may be allowed to execute in a controlled manner within a safe environment, such as security mechanism 214 (e.g., SandBox), to detect the actions without damage. Alternatively, the code of the querying application is analyzed by the analysis module to predict actions in response to the received response without allowing the querying application to execute, such as by conducting a future execution flow analysis (FEFA).

The actions (or prediction of actions) of the querying application may be compared by evasion manipulation module 250 to a response provided by the OS (i.e., the unmanipulated true response) and the manipulated response including a false indication. The comparison may be between a first case of emulating the secured environment and the second case of emulating the non-secured environment (regardless of the actual implemented security environment). The comparison may help in classifying the querying application as related to malicious or legitimate code. For example, a querying application sending a query to determine whether the execution environment is a virtual machine (which may host a SandBox) that receives an emulated reply falsely indicative of such a machine is expected to do nothing, or perform a short meaningless process (e.g., opening notepad or displaying a pop-up message). When instead the action is determined to be installation of an update according to the version of the emulated virtual machine, the querying application may be classified as a legitimate update processes. In another example, when the querying application receives an emulated response that no virtual machine is present and then tries to escalate a malicious attack, the querying application is identified as malicious code. If the querying application attempts to load a version of a program that is designed for a non-virtual machine instead, the querying application may be classified as legitimate.

The FEFA analysis may be performed by evasion manipulation module 250 by counting the number of processor instructions that arise from each possible query reply, such as the presence of the secure environment and/or the absence of the secure environment. The counting may be performed based on accessing and analyzing the executable instructions of the querying code stored within a local memory. The ratio between the number of instructions in each case may be calculated. When the querying application is legitimate, the number of instructions in each case may be similar (e.g., within a predefined range and/or threshold, for example, within 10% or 25%), for example, when in both cases an update will be installed, the difference being the OS the update is designed for. When the querying application is malicious code, the number of instructions may be significantly different (e.g., by a predefined factor threshold and/or range, for example, ×10, ×100, ×1000, ×10000), for example, when in the case of receiving a reply indicative of no installed security the malicious code activates (e.g., installing itself, decrypting itself, unpacking itself, contacting a command and control server, and/or start collection of sensitive data), and in the other case of the presence of the security mechanism the malicious code remains inactive or performs a simple irrelevant task.

The maximum number of processor instructions that may be reached in the code when each type of request reply (e.g., no security mechanism present and security mechanism present) is received by the querying application may be counted to perform the FEFA. When a conditional jump instruction is reached (i.e., which causes the processor to jump to another instruction to continue execution) the number of instructions for each case (e.g., true or false) is separately counted. The condition generating the higher number of instructions is considered. The counting continues until an exit instruction is reached (i.e., which defines the termination of the process). The ratio of the maximum number of counted instructions for both cases may be calculated and analyzed as described to help classify the querying application.

The ratio may be translated into a probability value (e.g., between 0 and 1) indicative of the probability of the requesting application being related to malicious code and/or legitimate code. For example, a low ratio may be mapped to a high probability that the querying application is malicious code using evasive techniques. For example, a high ratio may be mapped to a low probability that the querying application is malicious code using evasive techniques.

It is noted that the instruction counting is not necessarily performed using static analysis methods, since the querying application is executing.

Reference is now made to FIG. 6A which includes flowcharts depicting instruction execution flows according to responses received from queries, in accordance with some embodiments of the present invention. Flowchart 600 depicts execution flow for a legitimate application.

At 602, the legitimate application, for example, an OS update process, sends an OS system query regarding the execution environment. For example purposes, three possible responses are described (path A: blocks 604A 606A, path B: blocks 604B 606B, and path C: blocks 604C 606C). The execution of the legitimate application continues according to the received response, whether the response is true (i.e., provided by the OS) or emulated (i.e., false indication as described herein).

At 604A, the received response is indicative of a virtual machine (VM) environment, which may include a SandBox.

At 606A, the legitimate code fetches the proper updated for a VM, for example, from a remote update server via a network connection.

At 604B, the received response is indicative of a physical hardware (HW) environment, such as by manufacturer A (HW-A).

At 606B, the legitimate code fetches the proper updates for HW-A.

At 604C, the received response is indicative of a physical hardware (HW) environment, such as by manufacturer B (HW-B).

At 606C, the legitimate code fetches the proper updated for HW-B.

At 608, in all cases, additional generic software components may be fetched.

At 610, the fetched software components are installed by the querying code.

The total number of execution commands calculated by evasion manipulation module 250 do not differ significantly between paths A, B, and C, suggesting that the application is legitimate.

Flowchart 650 depicts execution flow for malicious code.

At 652, the malicious code sends an OS system query regarding the execution environment. For example purposes, three possible responses are described (path X: blocks 654X 656X, path Y: blocks 654Y 656Y, and path Z: blocks 654Z 656Z). The execution of the malicious code continues according to the received response, whether the response is true (i.e., provided by the OS) or emulated (i.e., false indication as described herein).

At 654X, the received response is indicative of a virtual machine (VM) environment, which may include a security mechanism such as a SandBox.

At 656X, the malicious code terminates execution in an attempt to remain evasive.

At 654Y, the received response is indicative of a physical hardware (HW) environment, such as by manufacturer A (HW-A).

At 656Y, the malicious code begins to activate to infect HW-A.

At 654Z, the received response is indicative of a physical hardware (HW) environment, such as by manufacturer B (HW-B).

At 656Z, the malicious code begins to escalate to infect HW-B.

At 658, when path Y or path Z have been followed, the malicious code executes, which may damage the host computing unit.

The total number of execution commands calculated by evasion manipulation module 250 differ significantly between path X (i.e., few command due to early termination), and paths Y and Z (i.e., many commands due to activation), suggesting that the code is malicious.

Reference is now made to FIG. 6B, which corresponds to flowchart 600 of FIG. 6A. FIG. 6B depicts two possible installation paths for an update by a legitimate process, an update to a certain manufacturer (HW-A) and an update to a VM (i.e., generic update). The total number of instructions (calculated by evasion manipulation module 250) executed when the response query indicates HW-A is 11007 (i.e., conditional jump instruction+3 procedure calls+2 for the add HW-A package procedure+1000 for the add generic packages procedure+10000 for the download&install procedure+ exit instruction). The total number of instructions (calculated by evasion manipulation module 250) when the reply indicates a VM is 11004 (conditional jump instruction+2 procedure calls+1000 for the add generic packages procedure+10000 for the download&install procedure+exit instruction). 11007 and 11004 are not statistically different (e.g. ratio is about 1), which suggests legitimate code.

Reference is now made to FIG. 6C, which corresponds to flowchart 650 of FIG. 6A. FIG. 6C depicts two possible paths for malicious code, which executes in response to physical hardware (HW-A) and terminates in response to a VM. The number of future instructions (calculated by evasion manipulation module 250) in response to the true OS response HW-A is 30005 (conditional jump instruction+3 procedure calls+10000*3 instructions per procedure+exit instruction). The number of future instructions (calculated by evasion manipulation module 250) in case of the Prevention module's response (VMWare) is 2 (conditional jump instruction+exit instruction). 30005 and 2 are statistically different (e.g. ratio is about 0), which suggests malicious code.

Returning now back to block 306 of FIG. 3, alternatively or additionally, a code (e.g., analysis module 234 and/or evasion manipulation module 250) implementable by processor 204 of hosting computing unit 202 tests the querying application to determine operations when the emulated response with false indication and/or the when the true response is received. The querying application may be tested, for example, when an analysis is unable to determine whether or not the querying application is malicious code, for example, when the probability of being related to malicious code is estimated at about 50%. The querying application may be tested in some or all cases, for example, to prevent incorrect blockage of legitimate applications. The querying application may be tested when new queries are identified, suggesting a new form of malicious code. The querying application, which may be malicious code, is provoked into performing a malicious action, such as escalation of a malicious attack. The malicious action may be identified, and used to classify the querying application as malicious code. When the querying application is legitimate code, the provocation may result in legitimate actions (e.g., attempt to install an update).

The querying application may be forwarded (e.g., by evasion manipulation module 250) to run in a testing environment, for example, in a SandBox. The forwarding of the querying application may be to a local security environment for a deep scan analysis, for example generated by a third party (e.g. an Anti Virus agent running on the host computer) and/or to a remote security environment. Forwarding may be performed, for example, by accessing an API of the testing environment, by providing the memory location of the stored querying code to the testing environment, and/or encapsulating the querying code in packets and/or frames for transmission to the testing environment. One or more additional queries for receiving the characteristic(s) may be detected among the operating system (OS) queries from the querying application. The querying application may send the additional query, for example, when the response has not been provided to the previous query. An additional response of the OS to the additional query may be prepared, as described herein. The response may be designed for provoking the querying application, which is suspected to be malicious code, to perform one or more malicious operation within the safe testing environment, such as escalate an attack. When the querying application is legitimate, the malicious operation is not performed. Legitimate operations may be performed. The additional response may include another false indication of an absence of execution of the security mechanism for processing running programs on the monitored computing unit. The false indication may be sent while the testing environment executes the security mechanism, to ensure that provoked malicious actions are safely contained and/or do not cause damage. The additional response is sent to the querying application in response to the additional query. The querying application is monitored (e.g., by the testing environment) to detect the malicious operation and/or the legitimate operation.

Detecting the actions by evasion manipulation module 250 may reduce false positive scenarios (e.g., incorrectly preventing a legitimate processes from working as expected, such as when emulating an environment in which the processes is not designed to work in) and/or false negative scenarios (e.g., failing to emulate a secured anti-malware environment to real malicious code, which may then activate in a computing unit without security software to stop the malicious code).

Optionally, at 308, code (e.g., analysis module 234 and/or evasion manipulation module 250 and/or residing on the central management server) implementable by processor 204 of hosting computing unit 202 classifies the querying application as malicious code. The querying application may be classified as related to malicious code or related to legitimate code according to the detected action(s) of block 306, as described herein. The querying application may be classified according to the calculated score of block 304.

Optionally, one or more functions of the querying application, which has been classified as malicious, are blocked from being executed by the monitored computing unit. Blocking may be performed by the locally installed security mechanism 214 (when installed), by the processor, by evasion manipulation module 250, and/or by a third party. Blocking may be performed when the malicious code has been provoked into execution, such as by emulation of the lack of the security mechanism. Alternatively or additionally, blocking may be performed when the malicious code is still in the evasive (e.g., packed and/or encrypted) state, as additional means of preventing damage by the malicious code. Blocking may be implemented by messages, such as API based messages, transmitted to the OS indicative of blocking operations of the malicious code.

Optionally, one or more third party security system modules 216 are notified of the detected malicious code (or possible malicious code) by evasion manipulation module 250, for example, by transmission of network messages, such as packets, and/or by accessing an API of the third party security system. Security modules 216 may reside within computing unit 202, or externally, for example, on a remote server, a locally connected different computing unit, or on a local central server (e.g., an administration server).

Optionally, third party system 216 is a security information event management system (STEM). Data related to the malware detection events are provided to the SIEM. The SIEM may generate correlations based on the data to detect the malicious code. The SIEM may share the data with other computing units, to identify malicious code. The sharing of data may improve the ability to identify malicious code or potential cyber-attack\incident that use this potential malware. By forwarding the information of potential malware to the SIEM system, the module provides intelligence and context for better decision making and supply a potential direction for further investigation\forensics of the malware while the malware itself is prevented (e.g. does not installed\executed).

For example, when 10 computing nodes (e.g. endpoints in the organization's' network) forward to the SIEM that there is a file that use evasion technique in a monitoring period (e.g. 2 hours) a module installed in the SIEM system may deduce that the file is a potential malware and/or that identify a cyber-incident for alerting the system operator. The alert triggers the system operator to investigate the computing nodes. The module may be integrated into the SIEM system or communicate therewith via a computer network.

Optionally, third part system 216 includes a malicious code detection mechanism to perform a detailed code scan to identify (and optionally remove) the malicious code. The scan may be focused on the process and/or file believed to contain the malicious code, instead of, for example, a complete scan of all (or a large portion) of code located on the computing unit. The focused scan may improve performance of the computer, as the focused scan requires less processor and/or memory resources, which reduces performance degradation, in comparison to a full scan of the computing unit. Moreover, occasion details scans (which degrade performance) performed to detect infections may be reduced, as the focused scans may be performed when a threat has been identified. The focused scan may detect the malicious code in the packed and/or encrypted state. In this manner, the systems and/or methods described herein may raise the detection rate of existing $3^{rd}$ party malicious code detection systems.

Optionally, data is provided to external research labs, for example, automatically transmitted over a network as network packets, and/or by sending a physical memory device (e.g., CD-ROM, external memory drive) to the lab. The data may help researchers design the next generation of anti-malware tools.

It is noted that alternatively or additionally, blocks 306 and/or 308 may be executed before block 106, to help in the decision of which response to provide to the querying application, the true response from the OS or the emulated response with false indication. The response type may be automatically selected by code executed by the processor based on the classification of the querying application as malicious code (e.g., send emulated response with false indication) or legitimate code (e.g., send true response from OS).

At 310, a system including multiple network nodes (physical devices and/or virtual machines), each node including an implementation of computing unit 200 and/or an instance of evasion manipulation module 250, is set-up to passively route malicious code to a designated target node and/or testing environment located within one or more nodes. The designated target node and/or testing environment may identify and/or remove the malicious code. The other nodes may be set-up to passively route the malicious code to the designated target node. The set-up may be controlled by the general policy and/or local policy of each node. The set-up may be automatically and/or manually configured by the central management server.

One or more code (e.g., evasion manipulation modules 250) of one or more other network nodes implementable by respective processors of respective nodes prepares false indication request replies for the malicious code, to indicate execution of the security mechanism by the monitored computing unit. The malicious code, after receiving the reply and being decided that the local environment contains an executing security mechanism, may spread (e.g., via the network connection, messaging, mail, infected portable storage drives, and/or the like) to another node. In this manner, the malicious code is passively routed based on the received false indications, until the malicious code reaches a designated target node (which may be one of several target nodes). One or more evasion manipulation modules 250 of the target network nodes prepare the false indication to provide to the querying malicious code, to indicate an absence of execution of the security mechanism for processing running programs on the local monitored computing unit. The malicious code, receiving the false indication and being deceived that there is no security mechanism executing, is passively provoked into activation, such as to escalate an attack. The malicious code may be safely activated within the installed security mechanism (e.g., SandBox), where the malicious code may be identified and/or removed.

Figure 5:
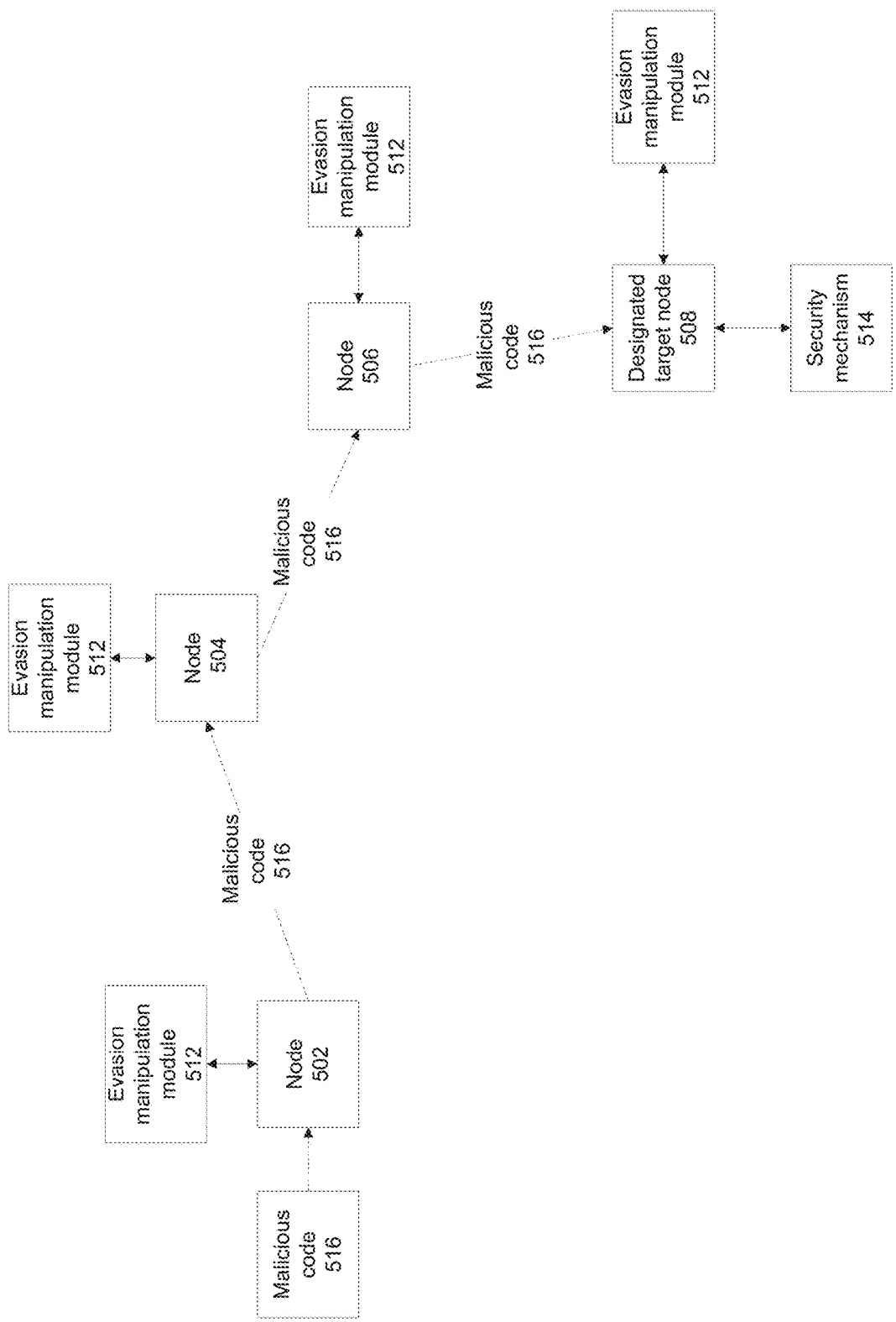
FIG. 5 is a schematic depicting passive routing of querying code, in accordance with some embodiments of the present invention.

Reference is now made to FIG. 5, which is a schematic diagram depicting passive routing of a querying application (which may have been classified as malicious code) to a designated target node, in accordance with some embodiments of the present invention.

Computing nodes 502, 504, 506, and 508 are part of a network, optionally centrally managed by a management server. Nodes 502, 504 and 506 do not necessarily have a security mechanism (e.g., a SandBox or other safe environment) installed. Evasion manipulation modules 512 (which correspond to evasion manipulation module 250 of FIG. 2) stored on or in association with nodes 502, 504 and 506 are programmed to provide a false indication of execution of the security mechanism to a querying application which may be malicious code. Node 508 is a designated target node, executing a security mechanism 510 that is able to identify and/or remove malicious code. Evasion manipulation module 512 of node 508 is programmed to provide a false indication of absence of execution of the security mechanism.

In operation, node 502 (or 504 or 506) is infected with malicious code 516, which receives a response with false indication of execution of the security mechanism. Code 516 remains evasive (i.e., does not execute), and travels to adjacent node 504 to try to infect node 504, for example, via network packets and/or frames according to a certain communication protocol. Code 516 receives the same or similar false indication and travels to node 506. Code 516 receives the same or similar false indication and travels to designated target node 508. Code 516 receives the false indication of absence of the security mechanism, and begins execution within security mechanism 510, where code 516 is safely identified and/or removed.

Referring now back to FIG. 2, optionally, computing unit 202 is in communication with management server 218, for example, via a network connection and/or local connection (e.g., point to point). Server 218 may be a local network connected server, a remote server, and/or a module installed on computing unit 202. Server 218 may provide code (e.g., a user interface module) implementable by a processor of server 218 containing instructions to allow a user, such an administrator, to control the systems and/or methods described herein (e.g., modules 210, 230, 222, 234, 236 and/or other related modules). Interface module may present a centralized view of the emulation activity on one or more computing units via a graphical user interface displayed on a display.

Some examples of functions provided by management server 218 include: deployment on computing units within a network (e.g., of an organization), updating computing units (e.g., with new responses to queries to provide to new malicious code), removing deployments, controlling emulation responses of each computing node (e.g., to passively route the malicious code to the designated target node as described herein), generating and/or distributing policies, monitoring emulation activity, control of computing units, and a central point of integration with third party detection systems and/or SIEM as described herein. Optionally, the management server displays a report mapping nodes (e.g. endpoints) throughout the network that does not contain the invented system.

Optionally, the management server generates or selects one or more policies to manage the computing nodes, optionally based on a computing node association. This allows applying different policies on different groups of computing nodes (for example a basic policy that includes minimal evasion handling techniques for computing nodes with non sensitive data and/or resources and a complex policy that includes various evasion handling techniques for computing nodes with more sensitive data and/or resources. Computing node categorization may be done manually via a GUI and/or automatically based on the above described crawling.

Optionally, communication between each computing node and the management server is performed through a reporting module (which may be a component of evasion manipulation module 250) installed on each computing node. The reporting module may gather relevant data received from the local processor, and transmit the data to the management server as packets and/or frames over the network or dedicated connection. Alternatively or additionally, the reporting module may transmit the gathered data to the third party security system.

Reference is now made to FIG. 7, which is a chart graphically comparing security provided by the systems and/or methods described herein in combination with other existing standard anti-malware security barrier methods, in accordance with some embodiments of the present invention. Examples of other existing security barriers include anti-virus (AV), SandBox (SB), Intrusion Prevention System (IPS), and host IPS (HIPS).

Malicious code may try to gain access into a target computing system using one or more ways, for example, as an attachment of to an email, by posing as a phishing website that lures the use to download the malicious code, by a human coming in physical contact with the computer and loading the malicious code from a removable memory card (also including for example social engineering hacking techniques), by propagation through a network connection, and by sharing of infected software. The malicious code may contain evasive methods to try and evade one or more of the security barriers.

When the systems and/or method described herein (e.g, evasion manipulation module 250) emulate the existence of the same security barriers that the malicious code is trying to evade, even if the malicious code is designed with the awareness of the systems and/or methods described herein, the malicious code will be identified more easily by the security barriers. The aware malicious code may try to not use evasive methods, to avoid being deceived by the systems and/or methods described herein, leaving the malicious code with few or no options of getting back the security barriers, and a high chance of being identified.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and devices will be developed and the scope of the term a computing unit and a network node, and a central unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for emulating at least one resource in a host computer to a querying hosted code, comprising:
   accessing and analyzing executable instructions of a querying code stored within a local memory of a monitored computing unit for monitoring a plurality of operating system (OS) queries received from a plurality of code executed on said monitored computing unit, said plurality of OS queries are designated to an OS of said monitored computing unit;
   detecting among said plurality of OS queries at least one query for receiving at least one characteristic of at least one resource of said monitored computing unit among said plurality of OS queries, said at least one query is received from querying code of said plurality of code;
   hooking a true response by said OS to said OS query before said querying code receives said true response;
   preparing a response of said OS to said at least one query, said response comprising a false indication at least one false characteristic of said at least one resource; and
   preventing the true response from reaching the hosted application and sending said response to said querying code in response to said at least one query;
   wherein said plurality of OS queries comprises a member of a group consisting of a function call, an event and a message;
   wherein said response is selected from a group consisting of:
   a preconfigured response emulating a response of a computing unit running a SandBox environment for executing said querying code; and
   a preconfigured response emulating a response of a computing unit of without an actual resource managed by said monitored computing unit.

2. The method of claim 1, wherein said false indication is of an execution of a security mechanism for processing running programs by said monitored computing unit, said false indication is sent while said monitored computing unit does not execute said security mechanism.

3. The method of claim 1, wherein said false indication is of an absence of execution of a security mechanism for processing running programs on said monitored computing unit, said false indication is sent while said monitored computing unit executes said security mechanism.

4. The method of claim 1, wherein said at least one query comprises a query for accessing at least part of sensitive data managed by said OS of said monitored computing unit; wherein said false indication comprises an indication of a false copy of said at least part of said sensitive data.

5. The method of claim 1, wherein said plurality of OS queries comprises a plurality of OS Application Program Interface (API) service requests selected to invoke said OS to perform a task at runtime.

6. The method of claim 1, wherein said monitoring unit comprises hooking said plurality of OS queries before said OS receives said plurality of OS queries.

7. The method of claim 1, further comprising classifying said querying code as a malicious code and blocking at least one function of said querying code from being executed by said monitored computing unit.

8. The method of claim 1, further comprising detecting at least one action performed by said querying code after receiving said response and classifying said querying code according to said at least one action.

9. The method of claim 8, wherein said detecting comprises matching said at least one action to a predefined model and classifying said querying code according to said match.

10. The method of claim 1, further comprising counting the number of processor instructions that arise from said response and classifying said querying code according to said counting.

11. The method of claim 1, wherein said response is the preconfigured response emulating a response of a computing unit running a SandBox environment for executing said querying code.

12. The method of claim 1, wherein said response is the preconfigured response emulating a response of a computing unit of without an actual resource managed by said monitored computing unit.

13. The method of claim 1, further comprising managing a general response policy defining a plurality of local response policies each for another of a plurality of monitored computing units including said monitored computing unit; wherein said preparing comprises preparing said response according to response instructions defined in a respective said local response policy.

14. The method of claim 13, further comprising in response to said detecting at least one query, managing said general response policy by dynamically correlating between at least some of said plurality of local response policies at run time, wherein said local response policy for each one of a plurality of monitored computing units is correlated based on said general response policy.

15. The method of claim 1, further comprising:
forwarding said querying code to run in a testing environment;
detecting at least one additional query for receiving said at least one characteristic among said plurality of operating system (OS) queries from said querying code;
preparing an additional response of said OS to said at least one additional query for provoking said querying code to escalate a malicious attack, said additional response comprises another false indication of an absence of execution of a security mechanism for processing running programs on said monitored computing unit, said false indication is sent while said testing environment executes said security mechanism;
sending said additional response to said querying code in response to said at least one additional query; and
monitoring said querying code for detecting said malicious attack.

16. The method of claim 1, further comprising calculating a score for said querying code and managing operations of said querying code according to said score.

17. A non-transitory computer readable medium comprising computer executable instructions adapted to perform:
accessing and analyzing executable instructions of a querying code stored within a local memory of a monitored computing unit for monitoring a plurality of operating system (OS) queries received from a plurality of code executed on said monitored computing unit, said plurality of OS queries are designated to an OS of said monitored computing unit;
detecting among said plurality of OS queries at least one query for receiving at least one characteristic of at least one resource of said monitored computing unit among said plurality of OS queries, said at least one query is received from querying code of said plurality of code;
hooking a true response by said OS to said OS query before said querying code receives said true response;
preparing a response of said OS to said at least one query, said response comprising a false indication at least one false characteristic of said at least one resource; and
preventing the true response from reaching the hosted application and sending said response to said querying code in response to said at least one query;
wherein said plurality of OS queries comprises a member of a group consisting of a function call, an event and a message;
wherein said response is selected from a group consisting of:
a preconfigured response emulating a response of a computing unit running a SandBox environment for executing said querying code; and
a preconfigured response emulating a response of a computing unit of without an actual resource managed by said monitored computing unit.

* * * * *